United States Patent [19]

Bononi

[11] 4,408,843
[45] Oct. 11, 1983

[54] HINGE JOINT FOR CHILDRENS EYEGLASSES

[76] Inventor: Walter H. Bononi, Zeppelinstrasse 9, 7012 Fellbach-Schmiden, Fed. Rep. of Germany

[21] Appl. No.: 205,266

[22] Filed: Nov. 10, 1980

[30] Foreign Application Priority Data

Nov. 14, 1979 [DE] Fed. Rep. of Germany ....... 2945938

[51] Int. Cl.³ .......................... G02C 5/14; G02C 5/22
[52] U.S. Cl. ..................................... 351/153; 351/122
[58] Field of Search ...................... 351/132, 153, 122; 2/450; 16/228

[56] References Cited

U.S. PATENT DOCUMENTS 3,528,728  9/1970  Miyamoto ........................... 351/153

FOREIGN PATENT DOCUMENTS 2739905  3/1979  Fed. Rep. of Germany ...... 351/132

*Primary Examiner*—John K. Corbin
*Assistant Examiner*—Rodney B. Bovernick

[57] ABSTRACT

A metal hinge for children's eyeglasses has a first hinge half connected to the temporal region of the lens bow and a second hinge half connected to the temple of the frame. To reduce the harmful effects when children's glasses are knocked about, one of the hinge halves is covered with a homogeneous silicone body which has a Shore D-hardness of between 10 to 30, measured by DIN 53505. The silicone body at least partially extends over the other hinge half.

8 Claims, 7 Drawing Figures

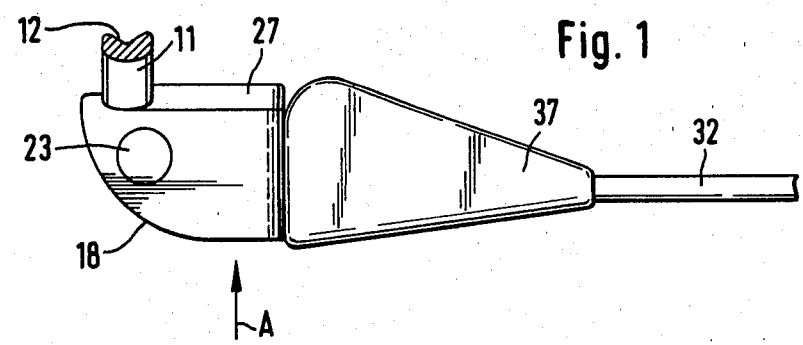
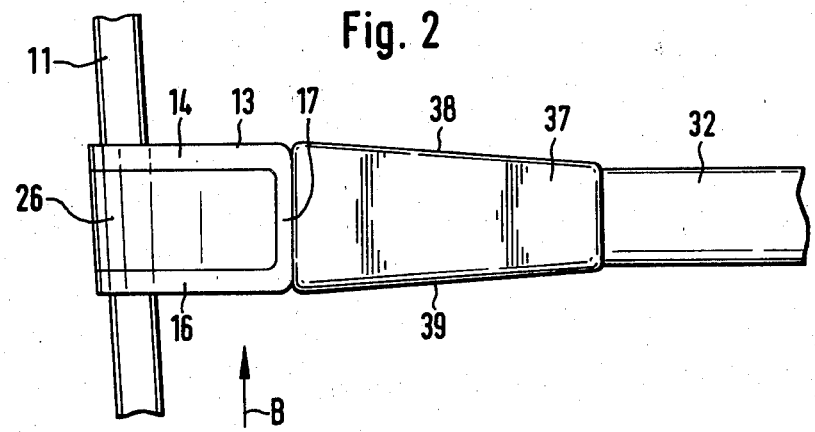
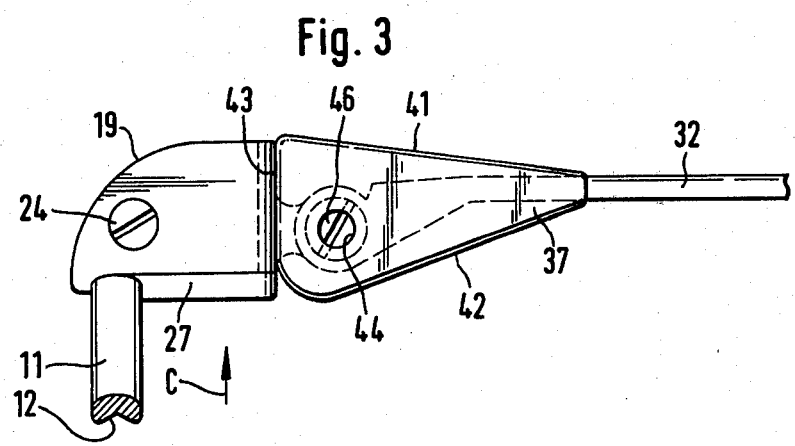

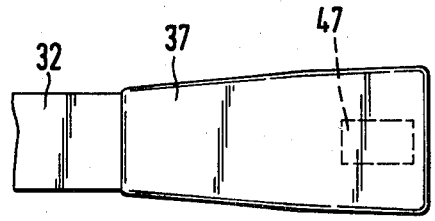
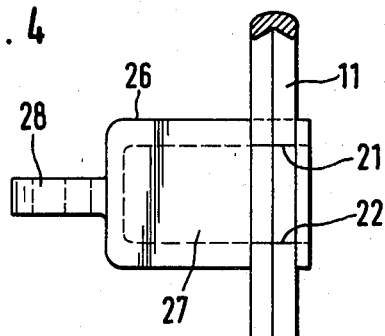
Fig. 4
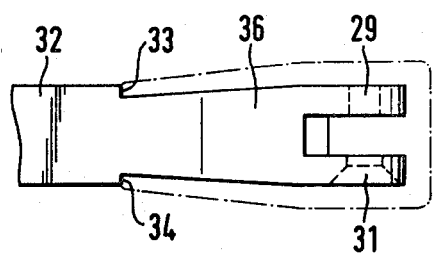
Fig. 5
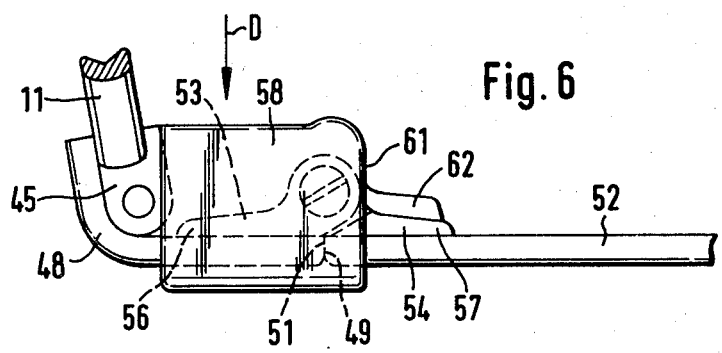
Fig. 6
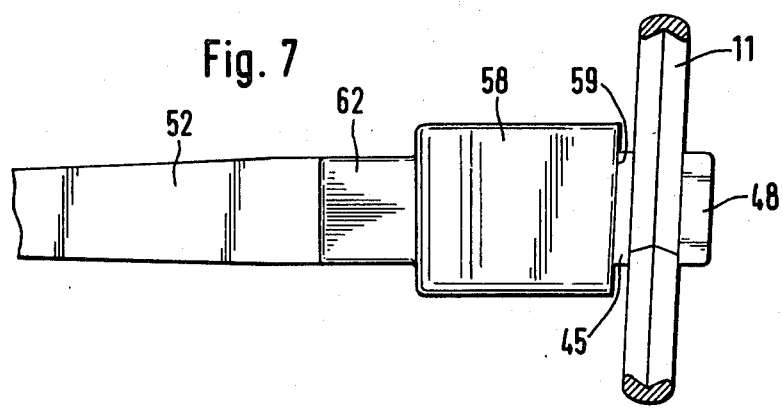
Fig. 7

HINGE JOINT FOR CHILDRENS EYEGLASSES

The invention concerns a metal hinge joint for children's eyeglasses, with a first hinge-half that is firmly connected to the temporal region of the lens bow and with a second hinge-half that is firmly connected to the temple of the frame.

BACKGROUND OF THE INVENTION

Children in particular are unable to judge as to how far the most projective parts of eyeglasses extend outward from the head. In playing and romping their eyeglasses are knocked against hard objects. This may result in injuries and/or the lenses may shatter and/or the hinges may bend and/or the opening mechanism of the temples may become defective and/or the pad levers may bend etc. There is no question about the seriousness of injury or shattered glass. What is widely unrecognized, however, is that eyeglasses will stress, rather than relieve, ocular physiology when eyeglasses do not have an optically correct fit. Manufacturers usually try to counteract these disadvantages by assuring an extremely sturdy eyeglass construction. This on the other hand tends to become the object of teasing among children who are quite capable of distinguishing aesthetic from unaesthetic designs. The end result is that the child avoids wearing the glasses.

OBJECTS AND STATEMENT OF THE INVENTION

The object of the invention is to reduce the above-named disadvantages without sacrificing the aesthetic aspect and without entailing high cost.

According to the invention this objective is reached in that at least one of the hinge-halves is covered with a homogeneous silicone body which, measured by DIN 53505, has a Shore D-harness of 10 to 30.

Advantageously, the invention includes the following additional features:

The silicone body is in bushing form. This assures all-around protection; the silicone body is easily manufactured and placed on the frame; if necessary on existing frames.

The silicone body is glued to the hinge half. It does not shift its position, but need not be attached in the manufacturing process of vulcanization, casting or similar processes.

The silicone body extends in part over both hinge halves.

The silicone body is arranged on the inside of the hinge half. Injuries are avoided; hair is not caught in this area and the silicon body is not seen.

The silicone body has an opening which provides access to a hinge screw so that the hinge joint construction can be changed at any time. In other respects, the silicone body may provide permanent lubrication for the hinge joints because the silicone body steadily liberates quantities of silicone, which although negligible, are adequate for lubrication.

The silicone body is at least 1 mm. thick at places subject to impact, preferably between 1 mm. and 3 mm. This assures adequate impact absorbtion while maintaining the aesthetic appearance of the design.

The silicone body has a stop-limiting surface for limiting the opening of the temple relative to the bow. The opening principle becomes a spring mechanism and at the same time, a "spring hinge" is created.

The silicone body covers the first hinge half and a tab corresponding to the width of the hinge extends from the silicone body on the inside of the hinge joint to said second hinge half. Thus, the hinge joint is covered at the inside, but it is unnecessary to bend the entire silicone body.

DESCRIPTION OF THE DRAWINGS

Preferred embodiment of the invention will now be described with reference to the drawings, in which FIG. 1 shows the top view of the left hinge area with broken-off temple and broken-off lens bow, FIG. 2 is a view per arrow A in FIG. 1, FIG. 3 is a view per arrow B in FIG. 2, FIG. 4 is a view per arrow C in FIG. 3, but not in exploded presentation, FIG. 5 is the view of the left part of FIG. 4, but without silicone body, FIG. 6 is a view similar to FIG. 1, but of a second exemplified embodiment, FIG. 7 is a view per arrow D in FIG. 6.

DETAILED DESCRIPTION OF THE INVENTION

A metal lens bow 11 has a lens groove 12. A U-profile 13 is provided in its temporal region. Its two legs 14, 16 proceed in horizontal direction and on the right continue in form of a vertical cross piece 17. As per FIGS. 1 and 3, the outer edges of legs 14, 16 are trimmed to form curves 18, 19. The U-profile 13 is metallically formed from straight material. Lens bow 11 is not continuous in the U-profile 13 area, as seen in FIG. 4. The upper end 21 of lens bow 11 is flush with the underside of leg 14 and the lower end 22 of lens bow 11 is flush with the upper side of lower leg 16. At this site, ends 21, 22 are also soldered to the inside thread running downward. Coaxially to this sleeve 23, a screw 24 is screwed into leg 16, whose shaft traverses a corresponding boring in leg 16 and whose head rests in a countersink of this boring. The more screw 24 is tightened the more leg 14 approaches leg 16 and the greater the tensile stress becomes in lens bow 11 with the lens inserted. The space enclosed by U-profile 13 is filled out by a body 26 of silicone rubber. Insofar as is visible in FIG. 2, it can also have a decorative function. It completely covers sleeve 23 including the screw shaft. On the inside of U-profile 13, it projects beyond U-profile 13 with a volume portion 27 up to a point where it corresponds to the thickness of lens bow 11. If desired a volume portion can be provided that rises, cushion-like, above curves 18, 19. Between ends 21, 22 a part of body 26 forms the continuation of lens groove 12, but of course not with the same rigidity.

A hinge lug 28 is soldered on the rear outside of cross piece 17. This has the usual through boring and works in coordination with two hinge lugs 29, 31, which engage with hinge lug 28 and have the usual coaxial borings, and tappings. Hinge lugs 29, 31 continue as seen in FIG. 5 to the left in form of a metal temple 32 which is a vertically positioned, approximately I-shaped I-profile. Beginning at a point approximately 10 mm left of hinge lugs 29, 31, are steps 33, 34 graduating inward, by whose height hinge stem 36 is thinner than temple 32.

A body 37 of silicone rubber with a Shore D-hardness of approximately 20, which includes the body 26, rests on this hinge stem 36. Body 37 is designed so as to gradually continue in form of the nonrecessed portion of temple 32. With its upper side 38 and its underside 39, it accommodates the contour of U-profile 13 in the forward direction and leads it to the upper and lower edges of temple 32.

According to FIGS. 1 and 3, outside 41 of body 37 accommodates outline of curves 18, 19 and leads the contours into outside of temple 32.

With its inside 42, body 37 accommodates the contour of volume portion 27 and leads the outline into inside of temple 32. When the temple is completely open, face 43 of body 37 is adjacent to crosspiece 17 and thus sets a spring-supported limit to the swing-out action of the temple. Face 43 is very large and it is even considerably larger than the areas limiting the opening action in plastic frames.

In coaxial position to the borings of hinge lugs 28, 29, 31, an opening 44 is provided in underside 39, which is smaller than a head 46 of a standard hinge screw located above it.

In the inner area of face 43 and in the frontal area of inside 42, body 37 has in cross-section a somewhat rectangular recess 47 (FIG. 4) through which hinge lug 28 can enter and place itself between hinge lugs 29, 31.

Steps 33, 34 serve as supports for the rear edge of body 37. Body 37 can be glued or cast on hinge stem 36. As the figures, particularly FIG. 5, show hinge lugs 29, 31 are enclosed on all sides by a thick, at least 1 mm-coating of silicon rubber.

In a second exemplified embodiment, the basic construction in comparison with standard metal frames has not been changed. Here we have, at lens bow 11, the standard sealing block 45. In standard procedure, a hook-shaped section 48 is soldered on, whose rear end-face 49 together with the front end-face 51 of metal temple 52 form the limit for the swinging action of the temple. End faces 49, 51 are in standard fashion bridged by two hinge-halves 53, 54 which in standard fashion are soldered with their foot pads 56, 57 on the inside of section 48 and temple 52.

A bushing 58 of silicone rubber slides over the hinge area. The face 59 of bushing 58 reaches forward just far enough to allow one to reach the screw of sealing block 45. In terms of wall thickness it is at least 1 mm thick. Its length and position is gaged such that its rear side 61 is considerably closer to end faces 49, 51 than is front side 59, so that in closing temples 52, bushing 58 is barely bent or not bent at all.

A tab 62 emerges, one-piece, from rear side 61, covering the part of foot pad 57 that projects backward from bushing 58 and shares the former's substance. Because tab 62 is reduced in shape compared to bushing 58 as seen in FIGS. 6 and 7, it can share the swinging motions of temple 52 without undue wear.

I claim:

1. A metal hinge joint for children's glasses, comprising:
   a lens bow having a temporal region,
   a temple,
   a first hinge half firmly connected to said temporal region of the said lens bow,
   a second hinge half firmly connected to said temple, and
   a homogeneous silicone body covering at least one of said hinge halves, said silicone body having a Shore-D hardness of between 10 to 30 measured according to DIN 53505, said silicone body having the form of a bushing, said silicone bushing surrounding one of said hinge halves and extending at least in part over both hinge halves.

2. A metal hinge joint according to claim 1 or 11, wherein said silicone body is glued to the hinge half.

3. A metal hinge joint according to claim 1, wherein said silicone body is arranged on the inside of the hinge half.

4. A metal hinge joint according to claim 1, comprising a hinge screw, wherein said silicone body has opening means to provide access to said hinge screw.

5. A metal hinge joint according to claim 1, wherein said silicone body is at least 1 mm. thick at places subject to impact.

6. A metal hinge joint according to claim 1, wherein said silicone body is between 1 mm. thick to 3 mm. at places subject to impact.

7. A metal hinge joint according to claim 1, comprising a stop-limiting surface on said silicone body for limiting the opening of said temple relative to said lens bow.

8. A metal hinge joint according to claim 13, wherein said silicone body covers said first hinge half, said silicone body having a tab corresponding to the width of the hinge, extending from said silicone body on the inside of the hinge joint over said second hinge half.

* * * * *